Figure 3:
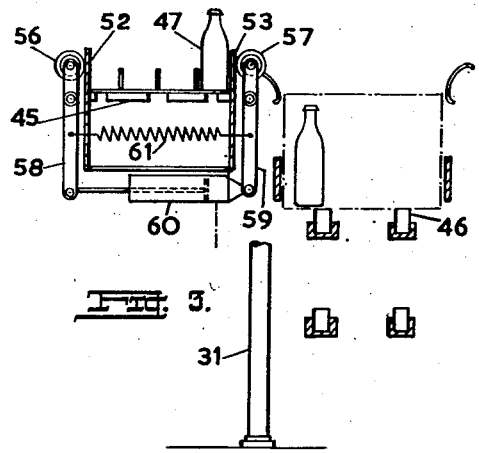

Sept. 24, 1957  F. G. GEORGE  2,807,125
ARTICLE TRANSFER DEVICES
Filed Sept. 8, 1954  6 Sheets-Sheet 1
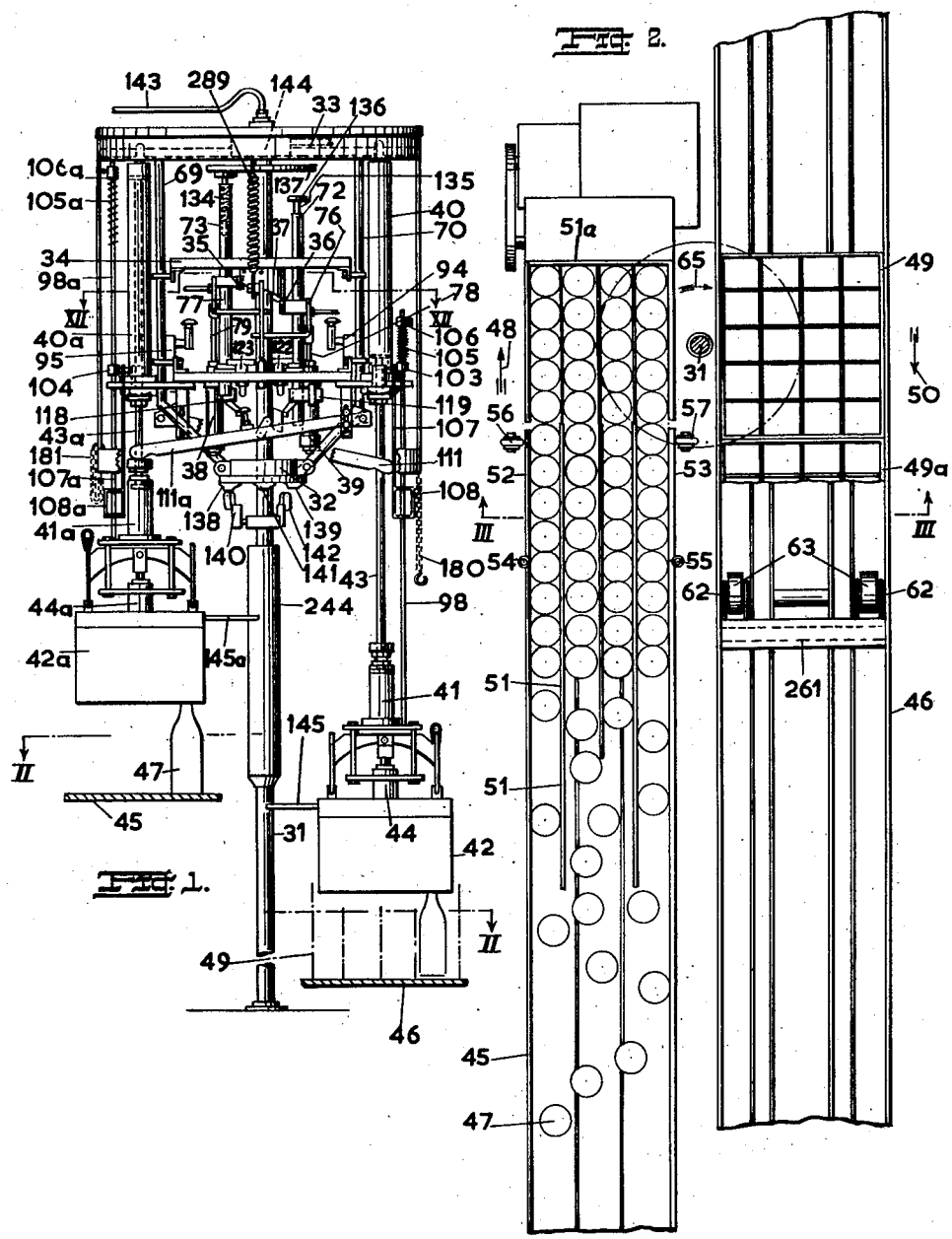
Inventor,
FRANK GERALD GEORGE Sept. 24, 1957 F. G. GEORGE 2,807,125
ARTICLE TRANSFER DEVICES
Filed Sept. 8, 1954 6 Sheets-Sheet 2

Inventor,
FRANK GERALD GEORGE
By Mead, Browne, Schuyler & Beveridge,
Attorneys

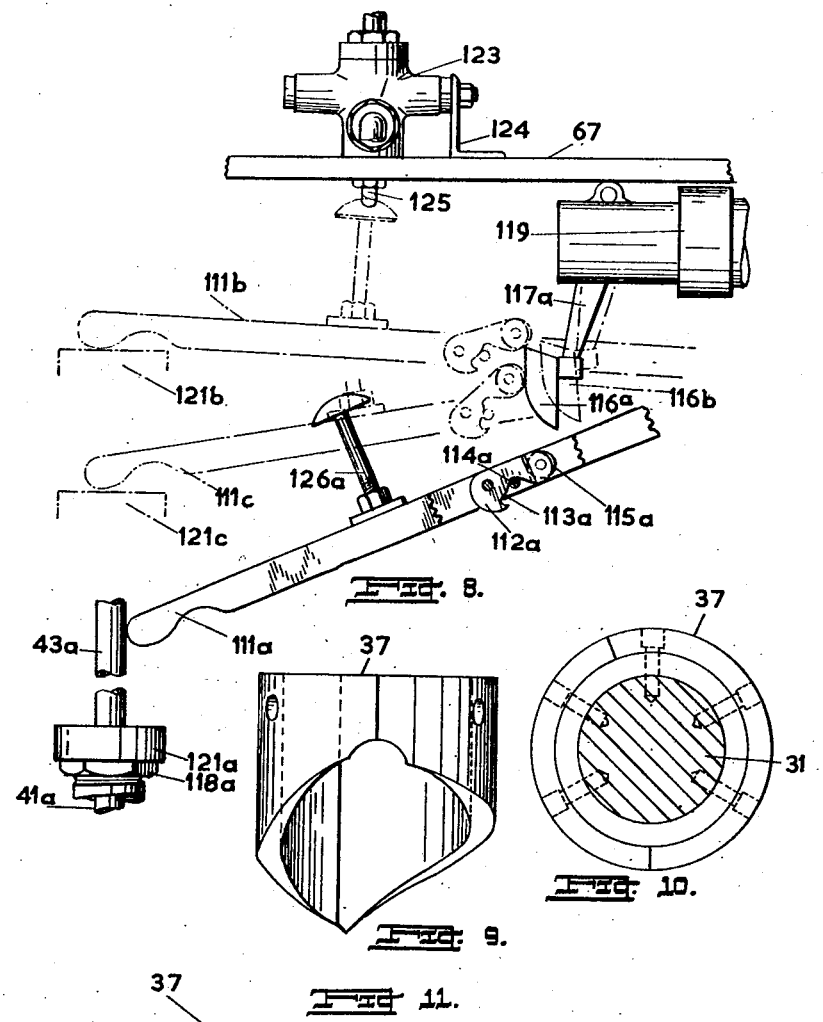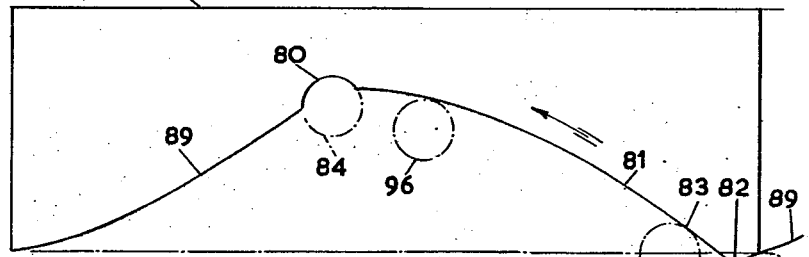

Sept. 24, 1957  F. G. GEORGE  2,807,125
ARTICLE TRANSFER DEVICES
Filed Sept. 8, 1954  6 Sheets-Sheet 4
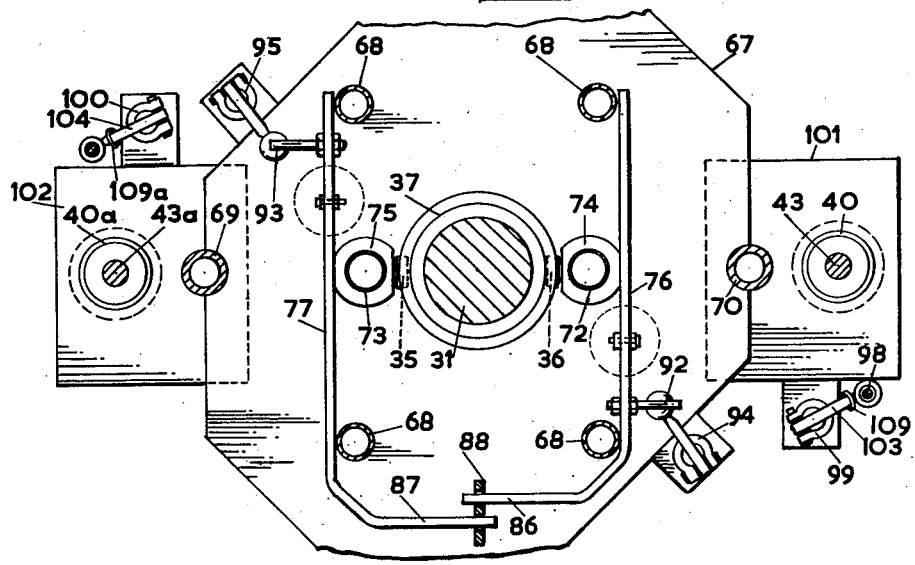
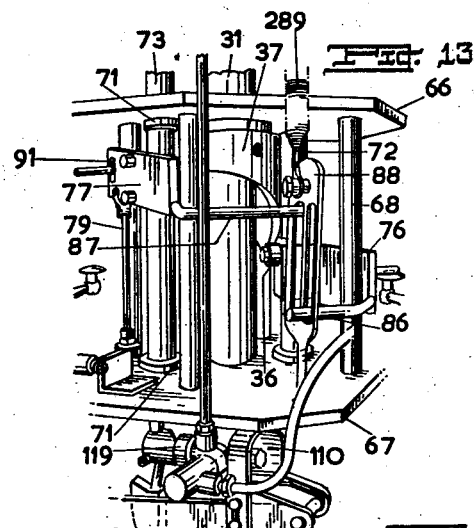
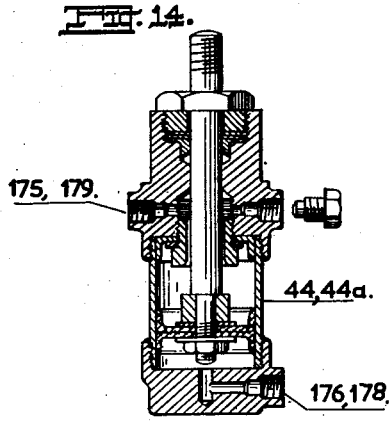
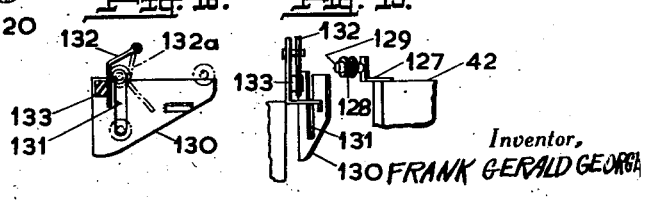
Inventor,
FRANK GERALD GEORGE
By Mead, Browne, Schuyler & Beveridge
Attorneys Sept. 24, 1957  F. G. GEORGE  2,807,125
ARTICLE TRANSFER DEVICES
Filed Sept. 8, 1954  6 Sheets-Sheet 5
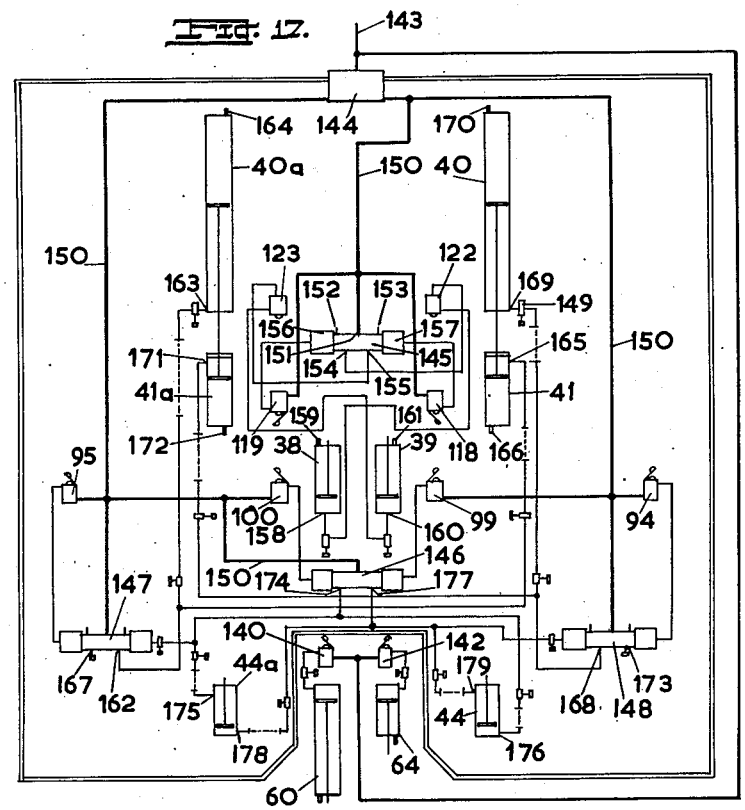
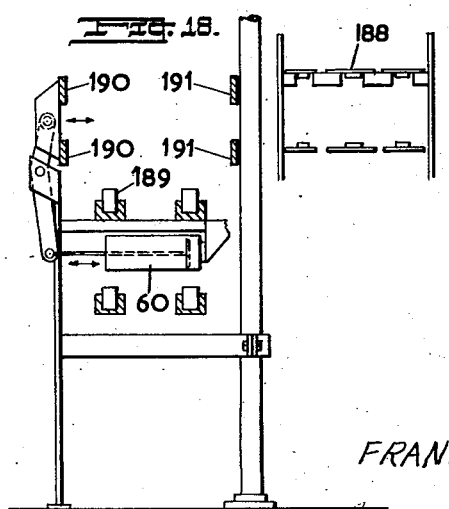
Inventor,
FRANK GERALD GEORGE
By
Attorneys Sept. 24, 1957     F. G. GEORGE     2,807,125
ARTICLE TRANSFER DEVICES
Filed Sept. 8, 1954     6 Sheets-Sheet 6
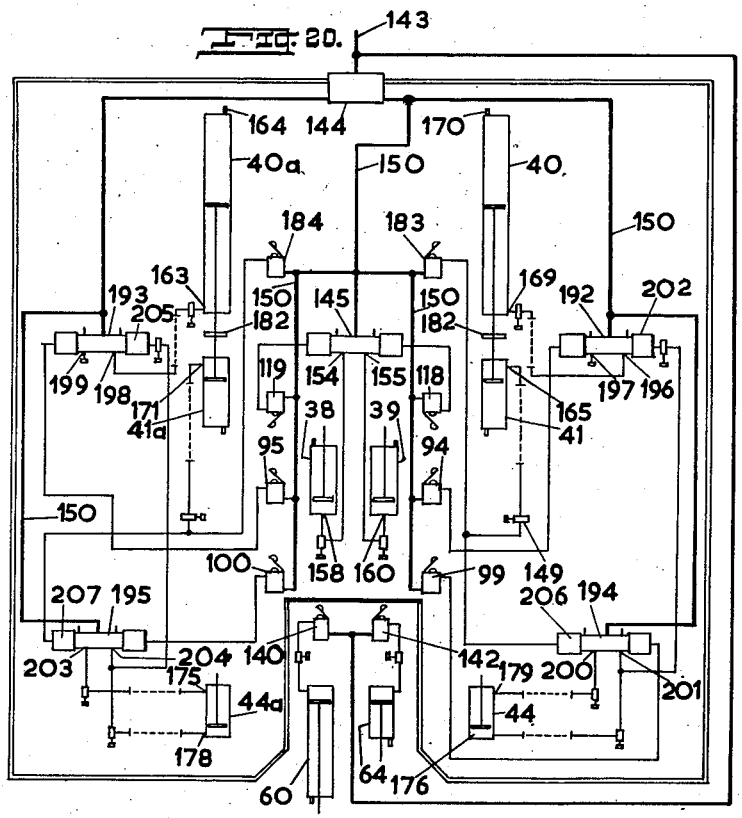
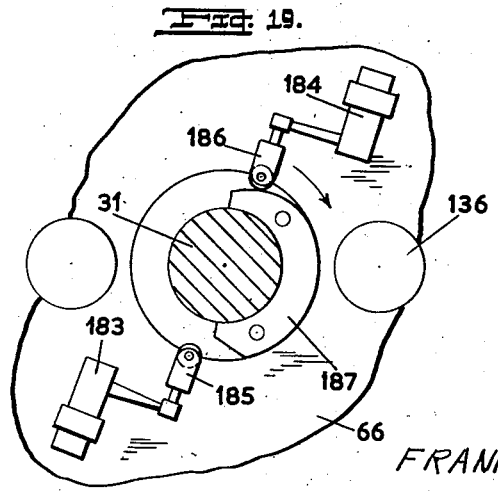
Inventor,
FRANK GERALD GEORGE

United States Patent Office 2,807,125
Patented Sept. 24, 1957

2,807,125

ARTICLE TRANSFER DEVICES

Frank Gerald George, Wembley, London, England, assignor to Express Dairy Company (London) Limited, London, England, a British company Application September 8, 1954, Serial No. 454,668

Claims priority, application Great Britain
October 19, 1953

14 Claims. (Cl. 53—166)

The present invention relates to article transfer devices and is particularly applicable to the transfer of uniform articles from one support to another. More particularly, the invention is especially applicable to the transfer of batches of bottles such as in loading or unloading of crates of bottles but is equally applicable to the transfer of batches of uniformly shaped articles to or from a container such as a carton.

In several branches of the food and beverage industries bottles are used as a convenient package for the purveying of food substances and the need often arises for transferring for example filled bottles into carton or crates for subsequent dispatch. Moreover in many cases the bottles are returned empty and after suitable cleaning and sterilisation may be re-used. Accordingly, in like manner the need arises for unloading cartons or crates.

An object of the present invention is to provide an apparatus which will auomatically transfer articles such as bottles from or to a container such as a crate. A further object of the invention is to provide an apparatus for transferring articles at a rate commensurate with the requirements of a filling or cleaning plant and which will require as small an amount of floor space as possible.

A further object of the invention is to provide an article transfer apparatus in which articles may be removed from or inserted into a container such as a crate at substantially the same time as a further batch of articles is delivered to or received from another article support.

According to the present invention an article transfer device includes at least one head adapted for selectively grabbing and releasing a plurality of uniform articles and reciprocable along a substantially vertical axis and means for advancing the head from one station to a second station by rotation around a substantially vertical axis spaced from and substantially parallel to the axis of reciprocation of the head.

Preferably at least two heads are provided diametrically disposed about the axis of rotation and the first station and second station are also diametrically opposed so that when one head is grabbing articles at one station the other head may be releasing articles at the second station.

The device according to the present invention may be readily adapted to operate in conjunction with two conveyors, the one for conveying cartons or crates and the other for conveying the articles. The conveyors may be arranged parallel to one another and the rotational axis of the apparatus may be disposed between the two conveyors. In operation for example in transferring articles into carton or crates, empty cartons or crates may be placed on one conveyor and conveyed towards the first station, whilst articles such as bottles may be placed on the second conveyor and conveyed towards the second station. On arrival of a batch of articles at the second station a head descends and is adapted to grab the articles whereupon it is raised. The head is now advanced in a circular path by rotation around the rotational axis, which is disposed between the conveyors, to the first station whereupon the head descends and releases the articles to insert them in a carton or crate which is in the first station. During this operation a second head is in the second station and descends to grab a further batch of articles. Upon its arrival in the first station for loading the carton or crate was arrested and subsequent to the release of the articles and raising of the head in the first station the loaded carton or crate is released and permitted to be conveyed away by the conveyor. It will be readily appreciated that the apparatus can be operated in a reverse manner to remove articles from cartons or crates and deposit them onto another conveyor.

By arranging for the head or heads to be advanced along a circular path an increased operating efficiency is obtained as compared with previously proposed arrangements in which one or more heads have been moved along a given path from a loading station to an unloading station and subsequently returned along said given path from the unloading station to the loading station since such prior proposals do not permit of one group of articles being gripped at the same time as another group of articles are being released.

The circular path along which the head or heads are moved according to the present invention may include any convenient number of loading stations and an equal number of unloading stations disposed intermediate the loading stations and the number of heads is preferably equal to the total number of stations. Thus four heads and two loading and unloading stations may be provided and may be associated with four conveyors in which case it is advisable for the conveyors carrying crates or cartons to be arranged at a different level or levels from the conveyors carrying articles or bottles. In such an arrangement the two conveyors carrying crates or cartons would be disposed substantially parallel to one another and substantially at right angles to the two conveyors carrying the articles, the latter conveyors being also substantially parallel to one another so that the movement of a head from a loading station to an unloading station and vice versa would be effected by advancement of a head through approximately 90° around the rotational axis.

In a preferred embodiment, the movement of the heads vertically and the rotation of the heads around the rotational axis and the operation of the heads to grab and release articles is effected pneumatically. A cradle is rotatably carried on a substantially vertical shaft and carries for each head at least one substantially vertically disposed piston and cylinder mechanism for reciprocation of the head along a vertical axis. The rotation of the cradle about a vertical shaft is effected by a swashplate mechanism in which two reciprocable cam followers selectively co-operate with a cam fixed around the vertical shaft. The operation of each head to grab or release the bottles is conveniently effected by a piston and cylinder mechanism carried by the head.

Figure 4:
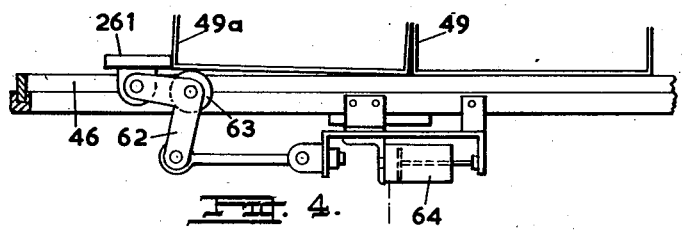
Figures 5, 6, 7:
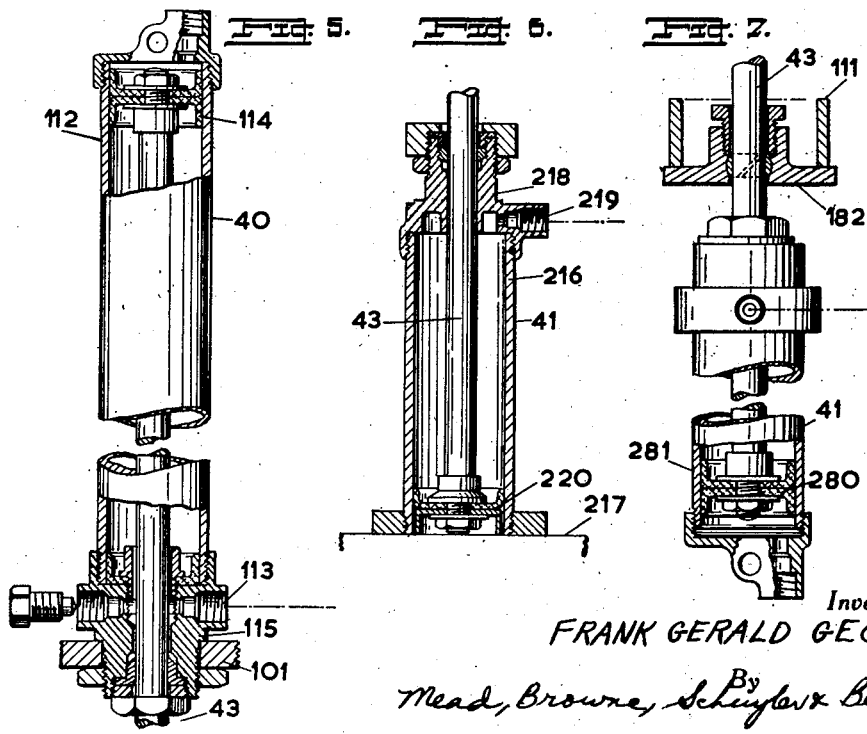

The invention will be further described by way of example only with reference to the accompanying drawings in which:

Fig. 1 is a side elevation of apparatus for inserting articles such as bottles into containers such as crates, with certain parts removed for the sake of clarity, Fig. 2 is a plan view along the line II—II of Fig. 1, Fig. 3 is a vertical section along the line III—III of Fig. 2, Fig. 4 is a detail view of a crate arresting device, Fig. 5 is a part sectional detail view of a piston and cylinder mechanism for vertically reciprocating a head, Fig. 6 is a sectional view of an additional piston and cylinder mechanism for reciprocating vertically a head in an apparatus for inserting bottles into crates, Fig. 7 is a part sectional view of an alternative second piston and cylinder mechanism for vertically operating a head in an apparatus for removing bottles from crates, Fig. 8 is a detail view of a valve interlocking and operating mechanism, Fig. 9 is a detail view of a swashplate cam, Fig. 10 is a detail view partly in section showing the fixing of the swashplate cam, Fig. 11 is a developed view of the profile of the swashplate cam of Fig. 9, Fig. 12 is a detail sectional plan view along the line XII—XII of Fig. 1, Fig. 13 is a detail perspective view of the swashplate mechanism, Fig. 14 is a sectional view of a piston and cylinder mechanism for operating the article-gripping mechanism of a head, Fig. 15 is a side elevational detail view of a safety interlock, Fig. 16 is a front elevation corresponding to Fig. 15, Fig. 17 is a diagram illustrating the pneumatic connections of an apparatus for inserting bottles in crates, Fig. 18 is a detail view partly in section of a crate retaining mechanism for an apparatus for removing bottles from crates, Fig. 19 is a detail view partly in vertical section of an auxiliary cam mechanism on an apparatus used for removing bottles from crates, and Fig. 20 is a diagram illustrating the pneumatic connections of an apparatus for removing bottles from crates.

Referring now to Fig. 1, a vertical shaft 31 carries rotatably mounted thereon by means of axially spaced bearings 32, 33, a cradle indicated generally at 34. Cam followers 35, 36, co-operate with a swashplate cam 37 fixed to the shaft 31 and are operated respectively by piston and cylinder mechanisms 38 and 39 carried by the cradle 34 and operated selectively to cause rotation of the cradle about the shaft 31. A piston and cylinder mechanism 40, the cylinder of which is connected to the cradle 34, and a piston and cylinder mechanism 41 the cylinder of which carries a head 42, have a common piston rod 43, and serve to support the head 42 and to impart a vertical reciprocating motion thereto. Similar piston and cylinder mechanisms 40a and 41a and a common piston rod 43a are associated with a second head 42a. Further piston and cylinder mechanisms 44 and 44a are associated respectively with the heads 42 and 42a and actuate the heads to grip or release the bottles.

Referring now to Fig. 2, the vertical shaft 31 of the apparatus is disposed intermediate two conveyor systems 45 and 46 conveying respectively bottles ready for loading and crates to be loaded. The conveyor 45 conveys the bottles which are indicated diagrammatically at 47 in the direction of the arrow 48, whilst the conveyor 46 conveys crates which are indicated diagrammatically at 49 in the direction of the arrow 50. A number of guide members, such as 51, are provided above the conveyor 45 so as to assemble the bottles uniformly in columns and rows.

The conveyor 45 urges the bottles 47 towards an end plate 51a and thus when the end bottle of a column abuts the end plate 51 and succeeding bottles abut each other there will be slipping between the bottles in that column and the conveyor 45. When a batch or group of bottles is raised by a head it is necessary to restrain the feed of the remainder of the bottles in the columns so as to avoid the lower parts of the bottles being raised from becoming engaged with the upper parts of the bottles being fed by the conveyor 45. For this purpose bottle-restraining means are provided by hinging portions of side walls above the conveyor. In the embodiment illustrated, twenty bottles are lifted by a head at a time, the bottles being arranged in five rows and four columns and side wall portions 52, 53, are hinged as at 54 and 55 to the remainder of the side walls. Rollers 56, 57 (Fig. 3) are carried on levers 58, 59, pivoted intermediate their ends and connected with a piston and cylinder mechanism 60. Normally the rollers 56, 57 are urged outwardly of the conveyor walls by a spring 61 but when the piston and cylinder mechanism 60 is operated the rollers are urged inwardly to bring the side wall portions 52 and 53 into abutment with the sixth bottle in each outer column to press them against the guides 51 which are slightly flexible thereby permitting the sixth bottle in all four columns to be restrained.

It is also advisable to restrain a crate prior to and during the time when a batch or group of bottles is inserted therein. One form of mechanism for achieving this is illustrated diagrammatically in Figs. 2 and 4. In Figs. 2 and 4 the crate indicated diagrammatically at 49 is in a position in which it will receive bottles from a head. Whilst it would be satisfactory to restrain movement of a crate when in such a position and subsequently after loading to release it for conveyance by the conveyor 46 it is found preferable to provide crate-restraining means at a position downstream of the loading position thereby enabling a loaded crate to be readily inspected before being conveyed away by the conveyor 46. Thus there is provided extending across the conveyor a stop member 261. Bell crank levers 62 pivotally mounted beneath the stop member 261 carry rollers 63 and are connected to a piston and cylinder mechanism 64 disposed beneath the conveyor 46. In operation, crates are urged along by the conveyor 46 until the leading edge of a crate 49a abuts the stop 261 and the succeeding crate 49 abuts the crate 49a and is in the loading position. Subsequently to the loading of the crate 49 the piston and cylinder mechanism 64 is operated and the rollers 63 raise the front part of the crate 49a so that it is urged over the stop member 261 by the conveyor and by contact with the succeeding crates on the conveyor. The piston and cylinder mechanism 64 is only operated momentarily and is subsequently released so that the crate 49 now advances to the position previously occupied by the crate 49a, that is to say, with its leading edge abutting the stop member 261.

Prior to describing the apparatus of the present invention in detail it is considered that a brief description of the sequence of operation of the apparatus would facilitate the understanding of the invention. Briefly speaking, in operation the conveyors 45 and 46 are set in motion and bottles and crates are urged into a bottle-removing and crate-loading position. The cradle 34 is rotated about the vertical shaft 31 in the direction of the arrow 65, Fig. 2, until one head for example 42a is above the bottle-removing position, and the other head, for example 42, is above the crate-loading position as shown in Fig. 1. The head 42a is now lowered by releasing the cylinder mechanism 41a, and the head 42 is lowered through a greater distance by release of the piston and cylinder mechanism 40. When the head 42 reaches its lowermost point the piston and cylinder mechanism 44 on the head 42 is released to release any bottles held therein, and at the same time the piston and cylinder mechanism 44a is operated to cause the head 42a to grab the group of bottles therebeneath. At the same time the piston and cylinder mechanisms 40 and 41a are operated to raise both the heads, and when both heads have reached their upper positions the piston and cylinder mechanism 39 is operated to cause cam follower 36 to travel along swashplate cam 37 and rotate the cradle through substantially 180° to bring the head 42, which is now empty, above the bottle removing position and the head 42a, which now carries a number of bottles, above the crate-filling position. During the movement of the cradle, the piston and cylinder mechanism 64 is actuated momentarily to permit the advancement of the crates, and the piston and cylinder mechanism 60 is released to permit the feeding of a further group of bottles into the bottle picking-up position.

When the cradle 34 has been rotated through substantially 180° the piston and cylinder mechanism 40a is released to enable the head 42a, which is now in the crate-loading position, to descend and cause bottles carried thereby to enter into a crate, whilst at the same time the piston and cylinder mechanism 41 is released to permit the head 42, which is now in the bottle-receiving position, to descend over a group of bottles. When the head 42a has fully descended the piston and cylinder mechanism 44a is released to release the group of bottles hitherto carried by the head 42a, and the piston and cylinder mechanism 44 is operated to cause the head 42 to grip a further group of bottles. The piston and cylinder mechanisms 40a and 41 are now re-operated to raise the heads, and when they have reached their uppermost positions the piston and cylinder mechanism 39 is released and the piston and cylinder mechanism 38 is operated to cause cam follower 35 to travel along the swashplate cam 37 and rotate the cradle through a further 180° so as to bring the heads 42 and 42a once more into the positions shown in Fig. 1. It will be appreciated that this cycle can then be repeated.

Whilst the operation of the various piston and cylinder mechanisms could be controlled manually, such as by manual operation of one or more valves, it is preferred that they should take place automatically and for this purpose, as will now be described, a number of pilot valves adapted to be operated by movement of various parts of the apparatus are provided.

Referring now to Figs. 1, 12 and 13, the cradle 34 includes an upper plate 66, a lower plate 67, separated by spacing members 68, and clamped to side limbs 69, 70. The upper and lower plates are bored and bushed as at 71 to slidingly receive tubes 72, 73. Attached to the tubes 72, 73, respectively, by means of collars 74, 75, are cross heads 76, 77, each of which slides over two of the spacing members 68. The collars 74 and 75 carry respectively the cam followers 35 and 36 which are engageable with the swashplate cam 37. Attached to the cross head 76 is piston rod 78 of piston and cylinder mechanism 39, whilst attached to cross head 77 is piston rod 79 of piston and cylinder mechanism 38.

Referring now to Figs. 9, 10 and 11, the swashplate cam 37 is formed conveniently by two complementary portions each of which is secured to the shaft 31 by means such as bolts. The profile of the cam 37 is shown clearly in Fig. 9 but is shown to greater detail in the developed view of Fig. 11. The profile includes a locking recess 80, a driving portion 81 and a crown 82, the portion 83 at the beginning of the driving portion 81 being substantially diametrically opposed to the locking recess 80.

When the cradle 34 is in a position such that one of the heads is above the crate-loading position and the other head is above the bottle picking-up position, one of the cam followers, for example 35, will be in the position indicated by the chain-dotted circle 84 and the other cam follower 36 will be in the position indicated by the chain-dotted circle 85. Such a position of the cradle is indicated in Fig. 1 and such positions of the cam followers in Fig. 13 and these correspond to the complete operation of the piston and cylinder mechanism 38 and to the release of the piston and cylinder mechanism 39. The urging of a cam follower into the recess 80 serves to lock the cradle against rotation.

After the lowering and raising of the heads, the pneumatic connections to the piston and cylinder mechanisms 38 and 39 are reversed so that the piston and cylinder mechanism 38 is released and the mechanism 39 is operated. Upon release of the piston and cylinder mechanism 38 the cam follower 35 is permitted to descend by gravity and come out of the locking recess 80. Meanwhile, operation of the piston and cylinder mechanism 39 urges cam follower 36 along the driving face 81 of the cam and thus causes the cradle 34 to rotate around the shaft 31 until the cam follower enters into the locking recess 80.

Each of the cross heads 76, 77, carries an extension 86, 87, both of which pass through a double-slotted plated member 88 which is resiliently loaded by means of spring 289 connected to an upper part of the cradle 34. When a piston and cylinder mechanism 38 or 39 is released, the cross head 77 or 76 connected thereto will descend under gravity until the extension 87 or 86 reaches the bottom of a slot in the plate 88, and as the cradle rotates around the shaft 31 the cam follower associated with that cross-head will come into engagement with a return guide portion 89 on the cam 37, whereupon the cam follower will be urged into engagement with the surface of the cam by the spring 289 and thus, during the end portion of the movement of the cradle as the cam follower appoaches the locking recess 80, the other cam follower will be depressed by the crown portion 82 into a position indicated by the chain-dotted circle 90 in Fig. 11 and is subsequently permitted to be raised under the influence of the spring 289 into the position indicated by the chain-dotted circle 85 in Fig. 11.

Each of the cross-heads 76, 77, is slotted as at 91 to receive respectively a projecting pin 92, 93 which co-operate with pilot valves 94, 95, respectively, such that the pilot valve 94 is only actuated by the projection 92 when the cam follower 36 is depressed by the crown 82 on the cam 37 and such that the pilot valve 95 is only operated by the projection 93 when the cam follower 35 is in similar manner passing over the crown 82 of the cam 37. Thus, it will be appreciated that as the cradle is rotated through substantially 180° around the shaft 31 by the piston and cylinder mechanism 38, the pilot valve 94 would be operated momentarily just before the end of such travel, and that in like manner the pilot valve 95 will be operated near the end of travel of the cradle under the influence of the piston and cylinder mechanism 39.

It will be noted from Fig. 11 that the slope of the driving portion 81 of the cam 37 is not constant but that it is sharper in the region of the point 83 and gradually decreases thereafter. As a result of this the twisting moment imparted to the cradle by the piston and cylinder mehcanism 38 or 39 is greater at the start of movement than at the end, and that the momentum acquired by movement of the table is sufficient to carry it through until the appropriate cam follower enters into the locking recess 80 on the cam 37. If, however, movement of the cradle is arrested a little before the position in which the cam follower enters the locking recess 80, the slope of the driving portion 81 is insufficient for the cam follower to exert enough turning moment to the cradle to cause it to rotate further. Since the operation of the pilot valves 94 or 95 initiates the lowering of the heads, as will be subsequently described, if the cradle is halted towards the end of its movement and a little before the depression of a cam follower by the crown 82, further movement of the cradle will not take place automatically as a result of operation of one or the other of the piston and cylinder mechanisms 38, 39. This feature may be conveniently used to provide a parking position for the cradle and corresponds to the cam followers being respectively in the positions indicated by the chain-dotted circles 96, 97, in Fig. 11.

Referring to Figs. 1 and 12, connected to heads 42, 42a, are respective control rods 98, 98a which are slidable in actuating arms 103, 104, of pilot valves 99, 100, carried on extension plates 101, 102 secured to the lower table 67. Each of the control rods carries a spring 105, 105a, for abutting the actuating arms 103, 104, and a collar 106, 106a. The position of the collar 106, 106a on the control rod is adjusted so that when the head has descended to its lowermost position in the crate filling station, the pressure exerted by the spring 105 or 105a operating arm 103 or 104, is sufficient to actuate the pilot valve 99 or 100 respectively so that the pilot valve 99 is operated as the head 42 reaches its lowermost position and the valve 100 as the head 42a reaches its lowermost position.

As will be subsequently described the operation of a pilot valve 99 or 100 initiates the raising of the heads and the operation of the heads to grab or release a group of bottles. Should the descent of the head in the crate loading position be obstructed, for example, by the presence of a crate so damaged as to obstruct the entry of bottles thereinto, it will be appreciated that the continued operation of the machine would be prevented and a manual operation is necessary to permit the machine to continue under such circumstances. For this purpose means are provided for permitting the pilot valve 99 or 100 to be operated manually. Additional control rods 107, 107a, having loops 108, 108a at their lower ends are slidably disposed alongside the control rods 98, 98a, and have at their upper ends hook-shaped portions 109, 109a embracing the operating arms 103, 104. Thus a manually applied downward pull to the loop 108 will bring about operation of the pilot valve 99.

As has been hereinbefore described, when the heads have been raised and have reached their uppermost positions the rotation of the cradle by the swashplate mechanism is initiated, and the arrangement of pilot valves for initiating this will now be described. Referring to Figs. 1, 8 and 13, pivotally mounted on brackets, such as 110, secured below the lower table 67 is a U-shaped lever 111 associated with the piston and cylinder mechanisms 40 and 41 supporting the head 42 and similarly a U-shaped lever 111a associated with the piston and cylinder mechanisms 40a and 41a associated with head 42a. Referring now more particularly to Fig. 8, pivotally mounted between the two limbs of the U-shaped lever 111a at a point intermediate its ends is a cam operating member 112a. The cam operating member is recessed as at 113a and rotation thereof relatively to the sides of the lever 111a is restricted by a pin 114a. Member 112a carries at its end a roller 115a which co-operates with a cam shoe 116a on an operating arm 117a of a pilot valve 119. In a similar manner the lever 111 carries a cam operating member for co-operating with a similar cam shoe on pilot valve 118 which may be seen in Fig. 1 but which is not shown in Fig. 8.

One form of construction of the piston and cylinder mechanism 40 is indicated in Fig. 5 and it includes a cylinder 112, to which connection is made through a port 113, and a piston 114 slidable within the cylinder. The piston 114 is disposed at the end of the piston rod 43 which is slidably disposed in cylinder head 115 which is mounted in a bore in extension plate 101 attached to the lower table 67.

One form of construction of the piston and cylinder mechanism 41 is illustrated in Fig. 6 and it comprises a cylinder 216, the lower end of which is connected to a head-carrying plate 217 and the upper end of which carries a cylinder head 218, connection being made to the cylinder by a port 219 in the cylinder head. A piston 220 slidable within the cylinder 216 is disposed at the other end of the piston rod 43 which is slidably mounted within the cylinder head 218.

It will be seen from Fig. 1, in particular, that the strokes of travel provided by the piston and cylinder mechanisms 40 and 41 are different, that provided by the piston and cylinder mechanism 40 being greater than that provided by the piston and cylinder mechanism 41. Thus by releasing the piston and cylinder mechanism 40 alone whilst operating the piston and cylinder mechanism 41, the head 42 may be allowed to fall through a greater distance than if the piston and cylinder mechanism 40 were operated and only the piston and cylinder mechanism 41 released. By this means the extent of descent of the head may be conveniently controlled as required.

The downward travel of the lever 111a is limited by a bolt 120 (Fig. 13) in bracket 110. When the cylinder 40 or 40a is released, the head 42 or 42a respectively will descend through a longer distance than if the piston and cylinder mechanism 41 or 41a alone were released, and consequently the lever 11a will descend to the limit of its downward travel. When the piston and cylinder mechanism 40a is operated to raise the head 42a, a boss 121a on the cylinder head 118a of the piston and cylinder mechanism 41a will contact the end of the lever 111a and lift it to bring the roller 115a into contact with the shoe 116a to displace it into the position shown by the chain-dotted line 116b in Fig. 8, thereby displacing the operating arm 117a and actuating the pilot valve 119. The uppermost position reached by the boss 121a is indicated by the chain-dotted line 121b. The operating arm 117a of the pilot valve 119 is resiliently loaded so that the pilot valve 119 is released when the lever reaches its uppermost position as indicated by the chain-dotted line 111b. If, however, the piston and cylinder mechanism 41a alone is released, then the boss 121a of the cylinder head 118a will only descend through a comparatively short distance to the position indicated approximately by the chain-dotted line 121c, thereby permitting the lever 11a only to descend into the position indicated by the chain-dotted line 111c. In this position of the lever the cam operating member 112a is in a displaced position relatively to the arms of the lever and the roller 115a is still riding on the shoe cam 116a. When the piston and cylinder mechanism 41a is operated to raise the head 42a, the roller 115a merely rides up the cam shoe 116a but does not cause displacement of the operating arm 117a or operation of the pilot valve 119.

Thus it will be appreciated that the pilot valve 118 or 119 associated with the head, which for the time being is in the bottle picking-up position, is not operated during the raising of that head, but that it is only the pilot valve which is associated with the head which is for the time being in the crate loading position which becomes operated momentarily during the last part of the raising of that head. As will be subsequently explained the operation of the pilot valve 118 or 119 initiates the reversal of the pneumatic connection to the piston and cylinder mechanism 38 and 39 to cause rotation of the cradle. It is, however, desirable as a safety precaution to ensure that both the heads have been properly raised to their fullest extent before movement of the cradle can take place. For this purpose there is associated with each of the levers 111, 111a, two pilot valves each of which is adapted to be operated only when the lever with which it is associated is in its uppermost position. One such valve 123 is indicated in Fig. 8 and is carried by a bracket 124 secured to lower table 67 with an operating rod 125 projecting through a bore in the table. The lever 111a carries a mushroom-shaped member 126a adjustably projecting therefrom and adapted to engage the operating rod 125 to operate the valve 123 when the lever is in its uppermost position corresponding to the complete raising of the head 42a.

In order to facilitate the more easy alignment of the heads with the bottles to be picked up, it is preferable to provide a stop means to prevent over travel of a head and to facilitate lowering a head in a predetermined degree of registration with the bottle to be picked up, and it is also preferable that braking means should be provided for slowing down the movement of the cradle as it approaches a position in which one or other of the cam followers 35, 36, would engage in the locking recess 80 in the cam 37. One suitable form of stop means is indicated in Figs. 15 and 16. Projecting from the side of a head 42 is a bracket 127 from which there projects a grooved roller 128 and an extension 129. Fixed relatively to the sides of the bottle conveyor 45 is a curved guide plate 130 which is slotted at 131 to receive the grooved roller 128 and so afford some degree of location of the head 42 when it is lowered. Pivotally mounted a little above and a little in advance of the slot 131 is an L- shaped stop lever 132 which normally hangs free in the position indicated by the chain-dotted line 132a. In the path of movement of the stop lever 132 is disposed a block 133 of suitable material such as rubber. In operation, as a head approaches the bottle picking-up position the grooved roller 128 runs along the top edge of the curved plate 130 and the projection 129 engages the stop lever and advances it from the position 132a to the position 132 in which it contacts the stop 133. Further rotational movement of the head is thereby arrested. Upon release of the piston and cylinder mechanism 41 to lower the head, the grooved roller 128 travels along the slot 131 and the projection 129 is disengaged from the stop lever 132 which under the influence of gravity swings back into position 132a, thereby releasing the head for subsequent advancement after it has been raised.

One form of brake mechanism is indicated diagrammatically in Fig. 1. The tubes 72 and 73 are each bored to receive springs, such as 134, and a rod member 135 carrying at its upper end a disc of friction material 136. Fixed to the shaft 31 is a disc 137 so disposed that as the tube 72 or 73 reaches the upper limit of its travel corresponding to the approach of the cam follower 35 or 36, respectively, towards and into the locking recess 80 on the cam 37, a frictional braking effort will be imparted to the cradle by the engagement of the friction pad 136 therewith. Thus, whilst a cam follower is located in the locking recess 80 of the cam 37, the corresponding friction pad will be in contact with the disc 137 so that both a braking and a locking action is exerted upon the cradle. When the pneumatic connections to the piston and cylinder mechanisms 38 and 39 are reversed the action of the spring 134 is such as to assist the effect of gravity to cause the tube 72 or 73 associated with the piston and cylinder mechanism which has been released to descend so as to disengage the cam follower associated therewith from the locking recess 80 in the cam 37, and subsequently to bring the friction disc out of contact with the disc 137.

The lower bearing 32 which rotatably mounts the cradle 34 on the shaft 31 also carries therebeneath a pair of cams 138, 139, adapted for operation of a pilot valve 140, and a second pair of cams only one of which is shown at 141 in Fig. 1, adapted for the operation of a pilot valve 142. As will be subsequently described, the pilot valve 140 is associated with the piston and cylinder mechanism 60 for restraining the feed of bottles, and the pilot valve 142 is associated with the piston and cylinder mechanism 64 for effecting the advance of the crates.

The upper bearing assembly 33 conveniently includes a gland connection whereby a supply of compressed air may be introduced through a pipe 143 to the rotatable apparatus. The lower portion of the shaft 31 preferably carries a guide sleeve 244 and each of the heads 42, 42a have inwardly projecting guide arms 145, 145a, adapted to co-operate with the guide sleeve 244.

The pneumatic connections to and from the various piston and cylinder mechanisms are preferably controlled by a number of balanced piston-operated change-over valves, but for the sake of clarity these have not been illustrated in Fig. 1. In a preferred arrangement, these piston valves are mounted on the cradle 34 so as to rotate with the other rotating parts but their precise location is not of prime importance but they are situated wherever most convenient having regard to the position of the pilot valves and piston valve is concerned.

The pneumatic connections of an apparatus for picking-up bottles and inserting them into crates is illustrated diagrammatically in Fig. 17. Compressed air is introduced through the gland 144 and passes to a common supply line 150 which leads to an inlet port of each of four piston-operated balanced piston valves 145, 146, 147, 148. Each of the piston-operated valves is of a well known type and includes, as indicated on valve 145, an inlet port 151, two exhaust ports 152, 153 and two outlet ports 154, 155. The valve is operated by piston and cylinder mechanisms 156, 157. In operation when a pulse of air is admitted to the cylinder 156 the piston valve is traversed to the right, and the outlet port 154 is put in communication with the inlet port 151 whilst the outlet port 155 is in communication with the exhaust port 153. When a pulse of air is admitted to the cylinder 157 the piston valve is traversed to the left and the outlet port 154 placed in communication with the exhaust ports 152, whilst the outlet port 155 is in communication with the inlet port 151.

The outlet port 154 of valve 145 communicates through safety valve 122 with a lower port 158 of piston and cylinder mechanism 38 whilst an upper port 159 thereof is open to exhaust. The outlet port 155 of valve 145 communicates via safety valve 123 with a lower port 160 of piston and cylinder mechanism 39, the upper port 161 thereof being open to exhaust. The admission of air to the left-hand cylinder 156 of valve 145 is controlled by pilot valve 119 whilst the admission of air to the right-hand cylinder 157 is controlled by pilot valve 118.

The right-hand outlet port 162 of the piston valve 147 communicates with a lower port 163 of piston and cylinder mechanism 40a, an upper port 164 whereof is open to exhaust. The outlet port 162 also communicates with the upper port 165 of piston and cylinder mechanism 41, a lower port 166 whereof is open to exhaust. The left-hand outlet port 167 of piston valve 147 is blanked off. Admission of air to the piston and cylinder mechanism at the left-hand end of valve 147 is under control of pilot valve 95.

The left-hand outlet port 168 of piston-operated piston valve 148 is connected to a lower port 169 of piston and cylinder mechanism 40, an upper port 170 whereof is open to exhaust, and also with an upper port 171 of piston and cylinder mechanism 41a, a lower port 172 whereof is open to exhaust. The right-hand outlet port 173 of the valve 148 is blanked off whilst admission of air to the right-hand cylinder of the valve 148 is under control of the pilot valve 94.

The left-hand outlet port 174 of piston-operated valve 146 is connected to an upper port 175 of piston and cylinder mechanism 44a, to a lower port 176 of piston and cylinder mechanism 44, and to the right-hand cylinder of the piston valve 147. The right-hand outlet port 177 of the piston valve 146 is connected to a lower port 178 of piston and cylinder mechanism 44a, to an upper port 179 of piston and cylinder mechanism 44, and to the left-hand cylinder of piston valve 148.

In order to control the speed of operation of the various piston and cylinder mechanisms and the like, throttling valves such as indicated by the reference numeral 149 are inserted in the connections from the piston valve to the ports of the piston and cylinder mechanisms. Only one such throttling valve is identified in Fig. 17 by the reference 149 and specific reference to the others have been omitted for the sake of clarity.

In operation let it be assumed for a starting point that the cradle is in the course of rotating into the position shown in Fig. 1. This movement will be achieved by operation of the piston and cylinder mechanism 38. Pilot valve 119 will have been operated to move piston valve 145 to the right to connect outlet port 154 with inlet port 151 to supply air through safety valve 122 to the lower port 158 of the piston and cylinder mechanism 39, and to connect the outlet port 155 with exhaust port 153 so as to exhaust the piston and cylinder mechanism 39 through the lower ports 160 and the safety valve 123. The piston and cylinder mechanisms 40, 41, 40a and 41a, are operated and both heads 42 and 42a are raised. The piston valve 147 will be moved to the left to supply air through outlet port 162 to the piston and cylinder mechanisms 41 and 40a, whilst the piston valve 148 will be moved to the right to supply air through outlet port 168 to piston and cylinder mechanisms 40 and 41a. The head 42 will be carrying a load of bottles and the head 42a will be empty. The piston valve 146 will be moved to the right to supply air through outlet port 174 to the upper port 175 of piston and cylinder mechanism 44a to unlock the bottle-gripping means in the head 42a, and to supply air to the lower port 176 of piston and cylinder mechanism 44 to move the bottle-gripping mechanism in the head 42 to grip the bottles.

As the cradle approaches the end of its substantially 180° movement, cam 138 operates pilot valve 140 to admit air to piston and cylinder mechanism 60 to arrest the flow of bottles, and the pilot valve 140 remains operated until the cradle moves out on its subsequent 180° rotation. As the cradle reaches the end of its travel the crown 82 of cam 37 depresses cam follower 36 to cause projection 92 to operate momentarily the pilot valve 94. Operation of the pilot valve 94 admits a pulse of air to the right-hand cylinder of piston valve 148 to move it into the left-hand position in which the outlet port 168 is connected to an exhaust port, and the piston and cylinder mechanisms 40 and 41a are released to permit the heads to drop, the head 42 to a greater degree to permit the bottles carried by it to enter into a crate and the head 42a to a lesser degree to enable the gripping mechanism in the head 42a to engage a group of bottles. When the head 42 reaches the bottom of its descent, the control rod 98 actuates the pilot valve 99 thereby admitting air to the right-hand cylinder of the piston valve 146 to move that valve to the left-hand position. The outlet port 174 is now connected to an exhaust port so as to exhaust the right-hand cylinder of piston valve 147, the upper port 175 of piston and cylinder mechanism 44a, and the lower port 176 of piston and cylinder mechanism 44. Simultaneously, the outlet port 177 is in communication with the air supply line 150 and air is supplied to the upper port 179 of piston and cylinder mechanism 44, to the lower port 178 of piston and cylinder mechanism 44a and to the left-hand cylinder of piston valve 148. The piston and cylinder mechanism 44 is now operated to unlock and release the group of bottles held by the head 42 whilst the piston and cylinder mechanism 44a is operated to cause the bottle-gripping mechanism in head 42a to grip the group of bottles thereunderneath. The admission of air to the left-hand cylinder of piston valve 148 places the outlet port 168 in communication with the air supply line 150 and supplies air to the lower port 169 of the piston and cylinder mechanism 40 and to the upper port 171 of the piston and cylinder mechanism 41a so that both the heads 42 and 42a are raised respectively by operation of the piston and cylinder mechanism 40 and 41a. Since the head 42a has only descended through a short distance, the amount of movement of the lever 111a is insufficient to bring about the operation of the pilot valve 119 when the head 42a is raised, but the head 42 has descended through a much greater amount and upon raising the head 42 the lever 111 brings about operation of the pilot valve 118 to cause air to be admitted to the right-hand cylinder of the piston valve 145 causing that valve to move over to the left. The piston valve 145 now places the outlet port 155 in communication with the inlet port 151 and connects the outlet port 154 to an exhaust port. When the head 42a has been fully raised the safety valve 123 is operated and similarly when the head 42 has been fully raised the safety valve 122 is operated. Upon operation of the two safety valves 122 and 123 air is permitted to flow through the valve 123 to the lower port 160 of the piston and cylinder mechanism 39 and air is similarly permitted to flow from the lower port 158 to the piston and cylinder mechanism 38 through the safety valve 122, thereby permitting the operation of the piston and cylinder mechanism 39 and the release of the piston and cylinder mechanism 38. The brake is now released and the cam follower 35 withdrawn from the locking recess 80 thereby permitting the cam follower 36 to travel along the driving portion 81 of the cam 37 and impart a rotary movement to the cradle.

Shortly after the cradle commences to rotate, the cam 138 releases the pilot valve 140 thereby releasing the piston and cylinder mechanism 60 under the influence of the spring 61 to permit the feed of a further group of bottles into the bottle picking-up position. During the rotation of the cradle a further cam, which is not shown in Fig. 1 but which corresponds to the cam 141 and is diametrically opposed thereto, operates pilot valve 142 momentarily to admit a pulse of air to the piston and cylinder mechanism 64 to release a crate in the position 49a and permit the feeding of a further crate into the loading position.

As the cradle moves into a position in which the head 42 is above the bottle picking-up position and the head 42a is in a position above the crate-loading position, the cycle of operations will be repeated as hereinbefore described except that instead of the pilot valve 94 the pilot valve 95 is operated to initiate the lowering of the heads, the pilot valve 100 instead of the pilot valve 99 is operated to initiate the locking and unlocking of the bottle gripping mechanisms and the raising of the heads, and the pilot valve 118 is operated instead of the pilot valve 119 to initiate further rotation of the cradle.

If during the operation it is required to interrupt continued operation of the apparatus, the cradle can be arrested manually during its rotation towards the end of a 180° movement, since the shape of the drive portion 81 of the cam 37 permits a rest position where the cam followers are in the positions corresponding to the chain-dotted circles 96 and 97 in Fig. 11. When it is desired to re-start operation of the machine it is only necessary for the cradle to be moved manually into the normal position in which the heads 42 and 42a are above the bottle picking-up and crate-filling positions, whereupon continued operation of the apparatus will ensue.

If during operations when, for example, the head 42 is lowered to insert bottles into a crate, the movement of the head 42 should be obstructed for any reason such as for example the presence of a badly damaged crate, such as to impede the entry of bottles therein, it will be appreciated that the head will not reach its lowermost position automatically nor will the pilot valve 99 become operated automatically. Further operation of the machine would cease and can only be started by manual operation of the pilot valve 99 which may be readily obtained by manually operating the rod 107.

It will be appreciated that the heads 42 and 42a are only raised when air is applied to the piston and cylinder mechanisms 40, 40a, 41 and 41a. In the absence of air pressure they would normally descend and in order to prevent fouling of the conveyor or other equipment by inadvertent lowering of the heads, safety suspension chains 180, 181 are provided for hooking on to the heads.

The embodiment of the invention hitherto described has been for an apparatus for picking-up bottles and loading them into crates, but the invention can with equal readiness be applied to an apparatus for unloading bottles out of crates. In the apparatus for re-loading crates it will be seen that the group of bottles is stationary before it is picked up by the bottle-gripping mechanism in a head, and further that a crate is stationary at the time when bottles are inserted therein by a descending head. The conditions surrounding an apparatus for unloading crates are in most cases slightly different insofar as the bottles are frequently deposited onto an already moving conveyor. Thus it is convenient if the bottles can be released at a time when they possess a component of motion in the direction of motion of the conveyor and thus the pilot valves and pneumatic circuits may be readily modified to permit the bottle-gripping mechanism in a head to be released a little before the head comes to rest and for the head to be raised through a short distance immediately after the bottle-gripping mechanism has been released, whereby the head may be moved clear of the tops of the bottles and so not interfere with their subsequent movement by the conveyor. These alterations in timings can readily be obtained by controlling the piston and cylinder mechanism 40 independently of the mechanism 41a and by controlling the piston and cylinder mechanism 40a independently of the mechanism 41, by controlling the piston and cylinder mechanism 44 and 44a for locking and unlocking the bottle-gripping means independently of one another and by the provision of two additional pilot valves and cam means for operating these pilot valves.

The piston and cylinder mechanisms 41 and 41a serve to raise the head 42, 42a respectively when they are in or near the bottle-carrying conveyor, that is to say, in the case of apparatus for loading bottles into a crate when they are in the bottle picking-up positon, and in the case of a crate re-loading apparatus the stroke of these piston and cylinder mechanisms must be such as to raise the group of bottles above the side and end walls of the conveyor. In apparatus for unloading crates, however, the stroke of these piston and cylinder mechanisms need not be so large as it is merely necessary for them to raise the heads sufficiently to clear the top of the bottles. Moreover, it is preferable that the lever 111 or 111a should be under the control of the piston rod 43 rather than under the control of the cylinder head 218. The means for suspending the heads is modified in apparatus for de-crating and comprises a piston and cylinder mechanism 40 as illustrated in Fig. 5, but the lower end of the piston rod 43 carries a modified form of piston and cylinder mechanism as illustrated in Fig. 7, though for the sake of simplicity in Fig. 20 the reference numerals 41 and 41a will be applied to these modified mechanisms as in Fig. 17. The lower end of the piston rod 43 carries a piston 280 slidable in a cylinder 281 having a shorter length than the cylinder 216 of Fig. 6. For engagement with one of the levers 111, 111a, there is provided around the piston rod 43, intermediate the two piston and cylinder mechanisms, a collar 182 adjustably positioned on the piston rod. Thus it will be appreciated that the lever 111 or 111a is only displaced when the upper piston and cylinder mechanism 40 or 40a respectively is released.

Two additional pilot valves 183, 184, are adapted to be operated by cam followers 185, 186, and are mounted on the upper table 66 as indicated in Fig. 19. A profile cam 187 is fixed relatively to the shaft 31 and is so shaped and so positioned that either of the valves 183, 184 becomes operated a little before, say 10° or 15°, before the cradle reaches the normal or locking position in which one or other of the heads is above the crate-unloading position.

It is preferable that a crate to be unloaded should be gripped in position and not merely prevented from being advanced by the conveyor. Referring now to Fig. 18, a bottle-receiving conveyor is illustrated diagrammatically as at 188 and is at a higher level than a crate-delivery conveyor which is illustrated diagrammatically as at 189. The crate-stopping mechanism illustrated in Fig. 4, is preferably provided beneath the conveyor 189 but instead of the bottle-restraining mechanism illustrated in Fig. 3, the piston and cylinder mechanism 60 is adapted to operate a crate-clamping mechanism including a movable crate-engaging member 190 for applying pressure sideways to a crate disposed between itself and a stationary abutment 191.

Referring now to Fig. 20, the piston valve 145 controls piston and cylinder mechanisms 38 and 39 and is itself controlled by the pilot valves 118, 119, in a similar manner as described in Fig. 17, with the exception that the safety valves 122 and 123 are not provided. The three piston valves 146, 147 and 148 in Fig. 17 and which serve to control the piston and cylinder mechanisms 40, 40a, 41, 41a, 44 and 44a, are replaced by four piston valves 192, 193, 194 and 195 of which valve 192 controls the piston and cylinder mechanism 40, valve 193 controls the piston and cylinder mechanism 40a, valve 194 controls the piston and cylinder mechanism 44, and the valve 195 controls the piston and cylinder mechanism 44a. A right-hand outlet port 196 of piston valve 192 is connected to the lower port 169 of piston and cylinder mechanism 40, whilst the left-hand outlet port 197 is blanked off. In a similar manner the right-hand outlet port 198 of piston valve 193 is connected to the lower port 163 of piston and cylinder mechanism 40a, whilst the left-hand outlet port 199 is blanked off. The admission of a pulse of air to the left-hand cylinder of piston valve 192 is controlled by pilot valve 94 and the admission of air to the left-hand cylinder of piston valve 193 is controlled by pilot valve 95.

A left-hand outlet port 200 of piston valve 194 is connected to the upper port 179 of the piston and cylinder mechanism 44, whilst the right-hand outlet port 201 is connected to the lower port 176 of the piston and cylinder mechanism 44 and also to the right-hand cylinder 202 of the piston valve 192. The left-hand outlet port 203 of piston valve 195 is connected to the upper port 175 of the piston and cylinder mechanism 44a, whilst the right-hand outlet port 204 is connected to the lower port 178 of the same piston and cylinder mechanism 44a and also to the right-hand cylinder 205 of piston valve 193. The pilot valve 183 is connected to the upper port 165 of piston and cylinder mechanism 41 and also to the left-hand cylinder 206 of piston valve 194, whilst in a similar manner the pilot valve 186 is connected to the upper port 171 of the piston and cylinder mechanism 41a and also to the left-hand cylinder 207 of the piston valve 195.

In operation let it be assumed that the cradle is in the course of rotation and is approaching a position corresponding to that illustrated in Fig. 1 for the re-crating apparatus. The cradle 34 is progressing under the direction of piston and cylinder mechanism 38 corresponding to the piston valve 145 being moved over to the right. Both the piston and cylinder mechanisms 40 and 40a are operated to raise the heads and correspond to piston valves 192 and 193 being in the left-hand positions. Piston valve 195 is in the right-hand position so that piston and cylinder mechanism 44a is in a position to release any bottles which might have been held in the bottle-gripping mechanism in the head 42a. Piston valve 194 is in its left-hand position so that piston and cylinder mechanism 44 is operated to cause the bottle-gripping mechanism in head 42a to grip the bottles.

During the early part of this movement, the pilot valve 183 is operated by the cam 187 so that air is admitted to the upper port 165 of the piston and cylinder mechanism 41 so that the head 42 is raised to its uppermost position partly by the piston and cylinder mechanism 40 and partly by the mechanism 41. After approximately 145° rotation of the cradle pilot valve 183 is released by cam 187. Furthermore, during this movement of the cradle the cam 141 operates pilot valve 142 to admit air to piston and cylinder mechanism 64 to permit the conveyor 189 to carry away the crate from which bottles have been taken.

As the cradle approaches the position corresponding to that shown in Fig. 1 for a re-crating apparatus, the cam 187 brings about operation of the pilot valve 184 whereby air is admitted to the upper port 171 of the piston and cylinder mechanism 41a and also to the left-hand cylinder 207 of the piston valve 195 which is moved to its right-hand position. Air is now passed through outlet ports 203 to the upper port 175 of piston and cylinder mechanism 44a to cause the bottle-gripping mechanism in the head 42a to release the bottles gripped thereby. At the same time as the bottles are released, the head 42a is raised slightly by the action of the piston and cylinder mechanism 41a so as to clear the tops of the bottles as they are deposited on the bottle conveyor 188. It will be appreciated that the positioning and adjustment of the cam followers 185, 186 and the cam 187 can be such that this operation will take place before the cradle has come to rest and that the bottles may be released therefore when they possess the component of motion in the direction of the conveyor 188, thereby eliminating shock imparted to the bottles when they come into engagement with the conveyor.

As the cradle reaches a locking position, cam follower 36 is depressed by the crown 82 of the cam 37 and the pilot valve 94 is operated to admit air to the left-hand cylinder of piston valve 192 thereby driving it to the right. Outlet port 196 is now connected to exhaust and the piston and cylinder mechanism 40 is released to lower the head 42 into engagement with the bottles in a crate. When the head 42 reaches its lowermost position, control rod 98 operates pilot valve 99 whereby air is admitted to the right-hand cylinder of piston valve 94 thereby moving it to the left. The connections to the upper and lower ports of the piston and cylinder mechanism 44 are reversed to cause the bottle-gripping mechanism in the head 42 to grip the bottles in the crate and at the same time air is passed from outlet port 201 to the right-hand cylinder 202 of piston valve 192 which is thereby restored to its left-hand position. Air is now once more supplied through outlet port 196 to the lower port 169 of the piston and cylinder mechanism 40 to raise the head 42 and the bottles gripped therein. When the piston rod 43 is in its uppermost position the collar 182 causes the lever 111 to operate pilot valve 118 to admit air to the right-hand cylinder of piston valve 145 so that the connections to the piston and cylinder mechanism 38 and 39 are reversed, port 158 being connected to exhaust and port 160 to the air supply 150, and the action of the piston and cylinder mechanism 39 now brings about further rotation of the cradle.

Whilst the cradle is in a position corresponding to that illustrated in Fig. 1, cam 138 operates pilot valve 140 whereby air is admitted to piston and cylinder mechanism 60 to clamp the crate from which bottles are being picked up, and, as the rotation of the cradle commences, pilot valve 140 is released whereby a crate is released so that its movements may be subsequently initiated when pilot valve 142 is operated during the movement of the cradle. The sequence of operations now continues in the same manner as before.

Any suitable form of bottle-gripping mechanism may be provided in the heads 42, 42a and by way of example one suitable form of mechanism has been described in my United States Patent No. 2,681,247, granted June 15, 1954. Whilst in the preferred embodiment described the control of the various parts is pneumatic, it will be appreciated that other forms of control may be equally suitable, such as hydraulic, fluid or electric.

Whilst the bottle gripping mechanism illustrated is adapted to pick up twenty bottles at a time, five in each of four columns the bottle gripping mechanism may be adapted to pick up any desired number of bottles in any desired distribution according to the size of bottle and the size of crate. For example with smaller bottles the bottle gripping mechanism may be adapted to pick up thirty bottles at a time, six in each of five columns, the appropriate number of guide members 51 being provided above the conveyor 45. The bottle gripping mechanism and the corresponding sets of guide members are preferably interchangeable.

Whilst the invention has been more particularly described with reference to apparatus for inserting bottles in crates and for removing bottles from crates, it will be appreciated that it is equally applicable to the transfer of uniform articles into or from suitable uniform containers and that the invention is therefore not restricted to the transfer of bottles.

The apparatus of the present invention is readily adaptable for use with existing conveyor systems and occupies a very small amount of floor space so that it may be readily accommodated in existing plants. Whilst in a preferred embodiment as particularly described the cradle carries two heads, it will be readily appreciated by those skilled in the art that a larger number of heads might be provided.

I claim:

1. In an article transfer device adapted to transfer a plurality of substantially uniform bottles which approach the device on a supply conveyor to one of a series of crates which approach and leave the device on a discharge conveyor, a plurality of transfer heads equi-angularly disposed about a first substantially vertical axis and adapted to grab said bottles from the supply conveyor and release said bottles into compartments in said crates, a plurality of baffles disposed above and in line with the supply conveyor to cause the bottles approaching on the conveyor in a random manner to bunch up and be selectively arranged in a position to be grabbed by said heads, arresting means associated with said supply conveyor and with said baffles for restraining the feed of bottles to said position when a head is in register therewith, further arresting means for temporarily arresting an approaching empty crate in a position for the bottles to be deposited therein and adapted to release the crate after the discharge of bottles theretowards to proceed along the discharge conveyor, actuating means for each of said arresting means, actuating means for said heads, means to reciprocate said heads along further substantially vertical axes and means to advance said heads along a substantially horizontal and circular path centered about said first axis from said one station to said other station and from said other station to said one station.

2. In an article transfer device adapted to transfer a plurality of substantially uniform articles from one station to another station, a plurality of transfer heads equi-angularly disposed about a first substantially vertical axis and adapted to grab and release said articles, actuating means for said heads, means to reciprocate said heads along further substantially vertical axes, means to advance said heads along a substantially horizontal and circular path centered about said first axis from said one station to said other station and in the same angular direction from said other station to said one station, a plurality of trip valves associated with said reciprocating means to initiate lowering of the heads when substantially in register with one of said stations, further trip valves operated on said lowering of the heads to initiate operation of said actuating means to cause the heads to selectively grab or release a plurality of said articles and also to initiate operation of said reciprocating means to raise the heads, and further pilot valves operated by the raising of the heads to initiate operation of said advancing means to advance the heads along said circular path from station to station.

3. In an article transfer device adapted to transfer a plurality of substantially uniform articles from one station to another station, a plurality of transfer heads equi-angularly disposed about a first substantially vertical axis and adapted to grab and release said articles, actuating means for said heads, means to reciprocate said heads along further substantially vertical axes, means to advance said heads along a substantially horizontal and circular path centered about said first axis from said one station to said other station and in the same angular direction from said other station to said one station, said advancing means comprising two piston and cylinder mechanisms co-operating with a swash plate disposed around said first vertical axis, rollers disposed on piston rods attached to the pistons of said piston and cylinder mechanisms running on an inclined face of said swash-plate.

4. In an article transfer device adapted to transfer a plurality of selectively arranged articles from one station at one level to another station at another level, a plurality of transfer heads equi-angularly disposed about a first substantially vertical axis and adapted to grab and release said articles, actuating means for said heads, means to reciprocate said heads along further substantially vertical axes, means to advance said heads along a substantially horizontal and circular path centered about said first axis from said one station to said other station and in the same angular direction from said other station to said one station, said reciprocating means comprising two piston and cylinder mechanisms associated with each head, said mechanisms having different lengths of piston stroke and a common piston rod, the cylinders being adapted to contain an operating fluid under pressure when the head is in a raised position, whereby the exhausting of one of said mechanisms will lower the head to a level commensurate with the grabbing or releasing of articles whilst at a first of said stations and the exhausting of both of said mechanisms will lower the head to a similar level with respect to a second of said stations, said second station being at a lower level than said first station.

5. In an article transfer device adapted to transfer a plurality of substantially uniform articles from one station to another station, a cradle rotatably mounted on a substantially vertical shaft, a plurality of transfer heads carried by said cradle and equi-angularly disposed about said shaft and each adapted to grab and release said articles, actuating means for said heads, means to reciprocate said heads relatively to said cradle along further substantially vertical axes, means to rotate said cradle about said shaft to advance said heads along a substantially horizontal and circular path from said one station to said other station and in the same angular direction from said other station to said one station; said rotating means comprising two piston and cylinder mechanisms on said cradle co-operating with a swashplate disposed around said shaft in fixed relation thereto, rollers disposed on piston rods attached to the pistons of said piston and cylinder mechanisms running on an inclined face of said swashplate, and valve means for controlling the supply of an operating fluid under pressure selectively to said piston and cylinder mechanisms; said reciprocating means for each head comprising an upper and a lower piston and cylinder mechanism, said upper and lower cylinder mechanisms having differing lengths of stroke and a common piston rod, means connecting the cylinder of the upper of said mechanisms to said cradle, means connecting the head to the cylinder of the lower of said mechanisms, valve means for controlling the supply of operating fluid under pressure selectively to said upper and lower piston and cylinder mechanisms, the cylinders of both said upper and said lower piston and cylinder mechanisms being adapted to contain an operating fluid under pressure when the head is in its uppermost position such that the exhausting of the cylinder of the lower of said upper and lower piston and cylinder mechanisms will lower the head to a first level at one of said stations and the exhausting of the cylinder of at least the upper of said upper and lower piston and cylinder mechanisms will lower said head to a second lower level at the other of said stations; a tripping assembly associated with each of said heads comprising a trip lever on said cradle and pivotally mounted at one end for rotation selectively to the cradle about a substantially horizontal axis, the other end region of said lever abutting a member movable vertically with movement of said common piston rod for imparting limited rotary movement to said lever, a pawl-like trip arm, means for pivotally mounting one end of said trip arm to said lever intermediate its ends, stop means for limiting the extent of movement of said trip arm relatively to said lever and for locating said trip arm in a terminal position relatively to said lever, a valve on said cradle associated with said first mentioned valve means for controlling the piston and cylinder mechanisms of said rotating means, an operating arm for said valve, a camshoe on said operating arm, said cam shoe co-operating with the other end of said trip arm and lying in the path of said other end of said trip arm when in said terminal position such that during movement of said lever consequent upon lowering of said head to said first level said other end of said trip arm rides on said cam shoe to cause rotation of said trip arm relatively to said lever away from said terminal position whereby subsequent raising of said head from said first level does not cause operation of said valve, and such that during movement of said lever consequent upon lowering of said head to said lower second mentioned level said trip arm is caused to rotate relatively to said lever whilst said other end of said trip arm rides on said cam shoe and subsequent disengagement of said shoe and said other end of said trip arm permits said trip arm to return to said terminal position whereby during subsequent raising of said head to its uppermost position said cam shoe lies in the path of said other end of said trip to be engaged and deflected thereby to effect momentary operation of said valve to initiate operation of said rotating means for rotating said cradle to advance the head from one station to another.

6. An article transfer device according to claim 5 including in each tripping assembly an abutment disposed on said lever, a normally closed interlock valve carried by said cradle and having an operating element in the path of said abutment for engagement thereby as the head reaches its uppermost position to open said interlock valve, said interlock valve being connected in series with an operating fluid supply line to one of the piston and cylinder mechanisms in said rotating means whereby to restrain rotation of said cradle unless all said heads are in their uppermost positions.

7. In an article transfer device adapted to transfer a plurality of substantially uniform articles from one station to another station, a plurality of transfer heads equi-angularly disposed about a first substantially vertical axis and adapted to grab and release said articles, actuating means for said heads, means to reciprocate said heads along further substantially vertical axes, means to advance said heads along a substantially horizontal and circular path centred about said first axis from said one station to said other station and in the same angular direction from said other station to said one station, said advancing means comprising a plurality of piston and cylinder mechanisms co-operating with a swashplate disposed around said first vertical axis, said plurality of piston and cylinder mechanisms being equal in number to the number of heads, rollers disposed on piston rods attached to the pistons of said piston and cylinder mechanisms and running on an inclined face of said swashplate, and valve means for controlling the supply of an operating fluid under pressure to said piston and cylinder mechanisms.

8. In an article transfer device according to claim 7, said swashplate including a driving portion inclined in one direction, a locking recess, a return guide portion inclined in a direction opposite to said one direction, and a crown, said driving portion being disposed intermediate said crown and said locking recess, and said return guide portion being disposed intermediate said locking recess and said crown, said driving portion subtending an angle greater than the angle subtended by said guide portion, whereby as one of said rollers approaches and enters said locking recess another roller has passed over said crown and moved onto the beginning of said driving portion.

9. In an article transfer device according to claim 7 said swashplate including in succession a driving portion inclined in one direction, a locking recess, a return guide portion inclined in a direction opposite to that of said driving portion, and a crown, braking means, and means actuated by said piston and cylinder mechanisms for actuating said braking mechanism for braking the advance of said heads at the time of the approach and entry of each and every one of said rollers towards and into said locking recess in said swashplate.

10. In an article transfer device according to claim 9 said braking mechanism comprising a stationary disc coaxial with said swashplate, a plurality of discs each associated with one of said piston and cylinder mechanisms and each movable into frictional engagement with said stationary disc, means interconnecting each of said discs with an individual piston rod for bringing each of said discs into engagement with said stationary disc as the roller attached to said piston rod approaches and enters said locking recess in the swashplate, said interconnecting means including a compression spring.

11. In an article transfer device adapted to transfer a plurality of substantially uniform articles from one station to another station, a plurality of transfer heads equi-angularly disposed about a first substantially vertical axis and adapted to grab and release said articles, actuating means for said heads, means to reciprocate said heads along further substantially vertical axes, means to advance said heads along a substantially horizontal and circular path centred about said first axis from said one station to said other station and in the same angular direction from said other station to said one station, said advancing means comprising a plurality of piston and cylinder mechanisms co-operating with a swashplate disposed around said first vertical axis, said plurality of piston and cylinder mechanisms being equal in number to the number of heads, rollers disposed on piston rods attached to the pistons of said piston and cylinder mechanisms and running on an inclined face of said swashplate, valve means for controlling the supply of an operating fluid under pressure to said piston and cylinder mechanisms, and braking means operatively associated with said piston and cylinder mechanism for braking the advance of said transfer heads as they approach said stations.

12. In an article transfer device adapted to transfer a plurality of substantially uniform articles from one station to another station, a plurality of transfer heads equi-angularly disposed about a first substantially vertical axis and adapted to grab and release said articles, actuating means for said heads, means to reciprocate said heads along further substantially vertical axes, means to advance said heads along a substantially horizontal and circular path centred about said first axis from said one station to said other station and in the same angular direction from said other station to said one station, said advancing means comprising a plurality of piston and cylinder mechanisms co-operating with a swashplate disposed around said first vertical axis, said plurality of piston and cylinder mechanisms being equal in number to the number of heads, rollers disposed on piston rods attached to the pistons of said piston and cylinder mechanisms and running on an inclined face of said swashplate, valve means for controlling the supply of an operating fluid under pressure to said piston and cylinder mechanisms, and interlock stop means at at least one of said stations for arresting advance of said heads as one of said heads is in register with said at least one of said stations and for restraining further advance of said heads until after the head in register has been lowered and raised.

13. In an article transfer device adapted to transfer a plurality of substantially uniform articles from one station to another station, a plurality of transfer heads equi-angularly disposed about a first substantially vertical axis and adapted to grab and release said articles, actuating means for said heads, means to reciprocate said heads along further substantially vertical axes, means to advance said heads along a substantially horizontal and circular path centred about said first axis from said one station to said other station and in the same angular direction from said other station to said one station, said advancing means comprising a plurality of piston and cylinder mechanisms co-operating with a swashplate disposed around said first vertical axis, said plurality of piston and cylinder mechanisms being equal in number to the number of heads, rollers disposed on piston rods attached to the pistons of said piston and cylinder mechanisms and running on an inclined face of said swashplate, valve means for controlling the supply of an operating fluid under pressure to said piston and cylinder mechanisms, and at one of said stations an interlock stop means comprising an L-shaped lever pivotally mounted upon a horizontal axis, each of said heads having a radially outwardly projecting extension, said lever hanging freely in the path of each of said extensions and adapted to be engaged by an extension as a head approaches said station, stop block in the path of said lever for arresting said lever when the head whose extensions are in engagement with said lever is in register with said station, the lowering of said head moving said extensions out of engagement with said lever to permit said lever to hang free in a position out of the path of said extension on the subsequent raising of said head, whereby advancement of said heads is arrested when one of said heads is in register with said station and further advancement of said heads is restrained until after said head in register has been lowered and subsequently raised.

14. In an article transfer device adapted to transfer a plurality of substantially uniform articles from one station to another station, a plurality of transfer heads equi-angularly disposed about a first substantially vertical axis and adapted to grab and release said articles, actuating means for said heads, means to reciprocate said heads along further substantially vertical axes, means to advance said heads along a substantially horizontal and circular path centred about said first axis from said one station to said other station and in the same angular direction from said other station to said one station, said advancing means comprising a plurality of piston and cylinder mechanisms co-operating with a swashplate disposed around said first vertical axis, said plurality of piston and cylinder mechanisms being equal in number to the number of heads, rollers disposed on piston rods attached to the pistons of said piston and cylinder mechanisms and running on an inclined face of said swashplate, valve means for controlling the supply of an operating fluid under pressure to said piston and cylinder mechanisms, braking means operatively associated with said piston and cylinder mechanisms for braking the advance of said transfer heads as they approach said stations, and interlock stop means at at least one of said stations for arresting advance of said heads as one of said heads is in register with said at least one of said stations and for restraining further advance of said heads until after said head in register has been lowered and raised.

UNITED STATES PATENTS

References Cited in the file of this patent

| | | |
|---|---|---|
| 1,400,894 | Mason | Dec. 20, 1921 |
| 1,927,087 | Freese | Sept. 19, 1933 |
| 1,935,739 | Freese | Nov. 21, 1933 |
| 1,987,336 | Powell | Jan. 8, 1935 |
| 2,253,283 | Minaker | Aug. 19, 1941 |
| 2,307,517 | Langler et al. | Jan. 5, 1943 |
| 2,540,612 | Fischer et al. | Feb. 6, 1951 |